Patented July 27, 1954

2,684,985

UNITED STATES PATENT OFFICE 2,684,985

PROCESS FOR SEPARATION OF METHYL PROPYL KETONE FROM MIXTURES CONTAINING VALERALDEHYDE

Alfred Steitz, Jr., Tulsa, Okla., assignor to Stanolind Oil and Gas Company, Tulsa, Okla., a corporation of Delaware No Drawing. Application April 20, 1951, Serial No. 222,164

6 Claims. (Cl. 260—593)

The present invention is concerned with a process for the purification of aldehydes and ketones. More particularly, it pertains to a method for separating valeraldehyde from methyl propyl ketone, each in a highly purified state.

As far as I am aware, methyl propyl ketone-valeraldehyde mixtures, at least of any consequence, have not had to be reckoned with prior to the undertaking of separating the various chemicals found in the primary water produced by the hydrogenation of carbon oxides over a fluidized iron catalyst, the conditions for such a reaction now being well known to the art. Thus, a commercial hydrocarbon synthesis plant now in operation and designed to produce in the neighborhood of 6000 bbls. per day of gasoline also produces a total of about 500,000 lbs. per day of oil- and water-soluble chemicals. Of this latter figure, approximately one-half is made up of water-soluble chemicals, the quantity of valeraldehyde contained therein varying from about 800 to 900 lbs. per day while the quantity of methyl propyl ketone amounts to something between 2000 and 4000 lbs. per day. Although the quantities of these two chemicals seem relatively small when compared with the amounts of various other chemicals present in the aforesaid primary water, they actually are far greater than have been available from any other previously known source. During certain steps in the separation of the water-soluble chemicals produced by the process referred to, it has been found that methyl propyl ketone is contaminated with from about 8 to about 30 per cent of valeraldehyde. In order, however, for these compounds to be readily marketable, they must each be recovered in a relatively pure condition.

Owing to the fact that valeraldehyde and methyl propyl ketone boil less than two degrees apart, i. e., 103.7° and 102.3° C., respectively, it has been found impossible to effect a sharp separation of these compounds from one another. Conventional separation methods, such as extractive distillation with a suitable extractant and fractionation of the mixture at varying pressures in the presence, as well as in the absence, of water, all have been tried without success. Also, attempts have been made to form selectively an acetal of valeraldehyde and a suitable alcohol in the presence of methyl propyl ketone, using hydrochloric acid or sulfuric acid as the catalyst in accordance with the reaction:

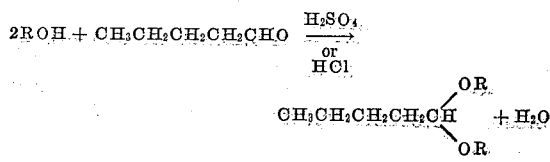

followed by fractionation of the resulting mixture to obtain methyl propyl ketone overhead. However, in neither case was a successful operation achieved. Thus, when employing hydrochloric acid as the catalyst, it was found necessary, after the acetal reaction had been completed, to neutralize the acid remaining in the mixture so that the acetal formed would not hydrolyze on subsequent distillation of methyl propyl ketone from the mixture. It was observed that, while this precaution prevented the reaction mixture from being acidic, the water added and the water liberated in the neutralization step was sufficient to cause appreciable hydrolysis of the acetal when it was attempted to recover methyl propyl ketone therefrom, even though no catalyst was present. The methyl propyl ketone thus obtained contains as much as 4 to 10 per cent valeraldehyde. Similar difficulties were encountered when using sulfuric acid as the catalyst. In addition, it was found that sulfuric acid was a particularly undesirable catalyst for use in preparing acetals of valeraldehyde, because it tended to bring about substantially complete polymerization of the aldehyde during the acetalization step.

Accordingly, it is an object of my invention to provide a method for recovering methyl propyl ketone from valeraldehyde, each in highly purified state, by selectively converting the valeraldehyde into a derivative having a boiling point sufficiently removed from the temperature at which methyl propyl ketone boils that by subsequent distillation treatment of the resulting mixture the methyl propyl ketone is obtained in a substantially pure aldehyde-free fraction. It is a still further object of my invention to provide a method for separating methyl propyl ketone from valeraldehyde whereby a maximum recovery of each of these compounds in a highly purified condition is effected. It is a further object of my invention to provide a method for separating ketones from aldehyde-containing mixtures such as, for example, those produced in HCS.

In carrying out my invention in accordance with a preferred embodiment thereof, a mixture of valeraldehyde, methyl propyl ketone and a suitable alcohol is refluxed in the presence of a phosphorus-containing acid catalyst such as, for example, ortho-phosphoric acid, and an inert water-immiscible organic liquid capable of forming a constant boiling mixture with water. The water formed during the reaction of the alcohol with valeraldehyde is removed as a constant boiling mixture and conducted to a separator from which the water may be withdrawn and the water-immiscible layer returned to the reaction vessel. After water can no longer be removed overhead. Water is then added to the reaction from the vessel in the aforesaid manner, refluxing of the mixture is discontinued and the water-immiscible liquid is distilled off, after which substantially pure methyl propyl ketone is collected vessel in an amount sufficient to hydrolyze all of the valeraldehyde acetal formed and to azeotrope with all of the valeraldehyde thus liberated.

The alcohols employed in preparing the acetal of valeraldehyde may be any of a relatively large group. However, in general, I prefer to employ primary alcohols because of the ease with which they react with valeraldehyde to form the corresponding acetal. Suitable examples of such alcohols are 1-butanol, 1-pentanol and the like. In this connection, if an excess of alcohol is employed, it will be apparent that the alcohol employed should be one whose water azeotrope boils at a temperature sufficiently removed from the boiling point of the valeraldehyde-water azeotrope to render the compounds readily separable from one another. Also, the alcohol should not azeotrope with the water-immiscible organic liquid used to remove the water or with valeraldehyde.

The catalyst utilized in carrying out the process of my invention may be any of a number of nonvolatile acids, such as the various phosphorus acids, for example, phosphorous acid and meta- and ortho-phosphoric acid; oxalic acid, boric acid, monochloroacetic acid and the like. The acid employed should be both nonvolatile and substantially inert with respect to valeraldehyde and methyl propyl ketone, and it is to be strictly understood that the expression "nonvolatile acid" appearing hereinafter is to be so construed. Usually, these nonvolatile acids may be employed as catalysts in accordance with the process of my invention in concentrations ranging from about 0.1 to 5 weight per cent based on the weight of the valeraldehyde present.

The inert water-immiscible organic liquids utilized herein to azeotrope with the water produced during the formation of the acetal may be selected from a rather wide variety of materials such as, for example, benzene, hexane, various petroleum hydrocarbons and the like. In any event, the particular material employed in addition to possessing the properties previously set forth should be capable of forming an azeotrope with water wherein the boiling point of such mixture is substantially lower than the boiling points of the water-valeraldehyde and water-methyl propyl ketone azeotropes, the water azeotrope of the alcohol employed in the acetalization step or any of the reaction products resulting therefrom. Normally, I prefer to employ such azeotroping agents in a concentration of from about 5 to 50 per cent based on the weight of the methyl propyl ketone-valeraldehyde mixture. In this connection, it is to be pointed out that, while I have proposed, in accordance with the foregoing discussion, to remove the water of reaction in the form of a constant boiling mixture with a suitable azeotroping agent, it will, of course, be appreciated that the object of my invention can also be accomplished by removal of the water in accordance with other methods as, for example, by the use of a suitable dehydrating agent, such as anhydrous sodium sulfate, calcium sulfate and the like. Also, a hydrocarbon azeotroping agent is not absolutely essential if it is desired to remove the water in the system by entrainment. Thus, any of the higher alcohols such as, for example, an excess of butyl or amyl alcohols in the reaction mixture serve this purpose very well.

The process of my invention may be further illustrated by the following specific example:

*Example*

To 200 parts of a methyl propyl ketone-valeraldehyde mixture in which the valeraldehyde was present in a concentration of 25 per cent, there was added 200 parts of 1-butanol and about 4 parts of 85 per cent phosphoric acid ($H_3PO_4$). The resulting mixture was then refluxed in the presence of about 100 parts of benzene and the water formed in the reaction distilled off in a constant boiling mixture with benzene. After the reaction was complete, as evidenced by failure of additional water to be carried overhead with the benzene, the latter was distilled off. On further distillation, dry methyl propyl ketone amounting to 141 parts (94 per cent recovery) was obtained as an overhead fraction. The methyl propyl ketone thus recovered contained 1 per cent valeraldehyde which subsequently was completely removed by the addition of about 7 parts of water and distilling off the aldehyde which is concentrated in the carbonyl-water azeotropes taken overhead. To the original still residue containing valeraldehyde was added approximately 150 parts of water, and the aldehyde-water azeotrope (B. P. 80.6° C.) was removed overhead by fractionating from the butanol-water azeotrope (B. P. 92° C.). The wet organic layer may be rendered anhydrous by means of a self-drying operation, preferably under reduced pressure. The valeraldehyde obtained in this manner had a purity of 93.3 per cent and amounted to about 92 parts or a 73 per cent recovery. The residual water in the still was removed from the 1-butanol by adding benzene and distilling, separating the water from the resulting distillate and returning benzene to the still. The dry alcohol-benzene-phosphoric acid mixture in the still was used in a subsequent run similar to that just described.

In a second experiment in which conditions identical with those employed above, with the exception that sulfuric acid was used as a catalyst in place of phosphoric acid, 78 per cent of the methyl propyl ketone was obtained (contained 0.7 per cent valeraldehyde as impurity) while only 2.2 per cent of a fraction containing 22.5 per cent valeraldehyde could be recovered.

In a third run in which hydrochloric acid was used as a catalyst, the other conditions employed were the same as those previously described, except that the acid catalyst was neutralized with 2N NaOH prior to methyl propyl ketone removal. Seventy-three per cent of the methyl propyl ketone containing 7.1 per cent valeraldehyde as impurity and 69 per cent of the valeraldehyde having a purity of only 86 per cent were recovered.

It is to be understood that the foregoing discussion and examples are merely illustrative of typical embodiments lying within the scope of my invention; and, in view of such discussion and examples, it will be apparent to those skilled in the art that certain modifications of my invention may be employed in treating mixtures of a somewhat different character. For example, in instances where it is desired to convert to primary alcohols by hydrogenation the aldehydes present in a mixture containing ketones and primary alcohols without simultaneously converting the ketones to less desirable secondary alcohols, this object can be accomplished by isolating the aldehyde fraction thereof in accordance with the principles herein set forth and thereafter hydrogenating said fraction in a known manner to obtain the corresponding primary alcohols. Thus, in the recovery of alcohols and aldehydes from various mixtures encountered in refining the nonacid chemical fractions obtained by the Fischer-Tropsch synthesis, a substantially pure alcohols fraction can be secured merely by adding a quantity of phosphoric acid or other suitable nonvolatile acid catalyst to the mixture, forming the acetals of the alcohols and aldehydes present therein in accordance with the procedure taught herein, distilling off ketones and other impurities, hydrolyzing the residual acetals and thereafter subjecting the hydrolyzed mixture to hydrogenation to obtain a fraction consisting essentially of alcohols.

What I claim is:

1. In a process for recovering methyl propyl ketone in a substantially pure state from a mixture containing valeraldehyde and methyl propyl ketone, the steps which comprise forming an acetal of valeraldehyde in the presence of a nonvolatile acid catalyst which is inert with respect to valeraldehyde, said acetal having a boiling point sufficiently removed from the temperature at which methyl propyl ketone boils that the latter can be readily separated from said acetal by distillation, continuously removing the water formed during the reaction until said reaction is substantially complete and subjecting the resulting substantially anhydrous reaction mixture to distillation to recover overhead substantially pure methyl propyl ketone in the presence of said acid catalyst and without substantial decomposition of said acetal.

2. In a process for recovering methyl propyl ketone and valeraldehyde each in a substantially pure state from a mixture containing valeraldehyde and methyl propyl ketone, the steps which comprise forming an acetal of valeraldehyde in the presence of a nonvolatile acid catalyst which is inert with respect to valeraldehyde, said acetal having a boiling point sufficiently removed from the temperature at which methyl propyl ketone boils that the latter can be readily separated from said acetal by distillation, continuously removing the water formed during the reaction until said reaction is substantially complete, subjecting the resulting substantially anhydrous reaction mixture to distillation to recover overhead substantially pure methyl propyl ketone in the presence of said acid catalyst and without substantial decomposition of said acetal, adding water to the resulting residue and thereafter continuing said distillation in the presence of said acid catalyst to recover said valeraldehyde in substantially pure form.

3. The process of claim 1 in which ortho-phosphoric acid is employed as the nonvolatile acid catalyst.

4. In a process for recovering methyl propyl ketone in a substantially pure state from a mixture containing valeraldehyde and methyl propyl ketone, the steps which comprise adding to said mixture a sufficient quantity of 1-pentanol to convert all of said valeraldehyde to the corresponding acetal, refluxing the resulting mixture in the presence of a nonvolatile acid catalyst which is inert with respect to valeraldehyde, continuously removing the water formed during the reaction until said reaction is substantially complete, thereafter subjecting the resulting substantially anhydrous reaction mixture to distillation to recover overhead substantially pure methyl propyl ketone in the presence of said acid catalyst and without substantial decomposition of said acetal.

5. In a process for recovering methyl propyl ketone in a substantially pure state from a mixture containing valeraldehyde and methyl propyl ketone, the steps which comprise adding to said mixture a sufficient quantity of 1-butanol to convert all of said valeraldehyde to the corresponding acetal, refluxing the resulting mixture in the presence of a nonvolatile acid catalyst which is inert with respect to valeraldehyde, continuously removing the water formed during the reaction until said reaction is substantially complete, thereafter subjecting the resulting substantially anhydrous reaction mixture to distillation to recover overhead substantially pure methyl propyl ketone in the presence of said acid catalyst and without substantial decomposition of said acetal.

6. In a process for recovering methyl propyl ketone in a substantially pure state from a mixture containing valeraldehyde and methyl propyl ketone, the steps which comprise forming an acetal of valeraldehyde in the presence of a nonvolatile acid catalyst which is inert with respect to valeraldehyde, said acetal having a boiling point sufficiently removed from the temperature at which methyl propyl ketone boils that the latter can be readily separated from said acetal by distillation, continuously removing the water formed during the reaction, thereafter subjecting the resulting substantially anhydrous reaction mixture to distillation in the presence of said acid catalyst and without substantial decomposition of said acetal to recover overhead an azeotropic mixture of methyl propyl ketone and valeraldehyde, in which the latter is present in a concentration not in excess of about 2 weight per cent, adding water to the distillate thus obtained and thereafter separating the valeraldehyde from methyl propyl ketone by distilling overhead all of the valeraldehyde present in the form of its aqueous azeotrope, leaving a residue consisting of substantially pure methyl propyl ketone.

References Cited in the file of this patent

UNITED STATES PATENTS

| Number | Name | Date |
|---|---|---|
| 1,907,822 | James | May 9, 1933 |
| 2,223,421 | Hubacher | Dec. 31, 1940 |
| 2,295,760 | Schreiber | Sept. 15, 1942 |
| 2,535,458 | Roberson | Dec. 26, 1950 |

OTHER REFERENCES

Fieser et al.: "Organic Chemistry," pp. 221–222. Copyright 1944 by D. C. Heath and Co., Boston.